United States Patent [19]
Peckham

[11] 4,082,117
[45] Apr. 4, 1978

[54] MANUALLY OPERATED LAWN SPRINKLING OR IRRIGATING SYSTEM

[76] Inventor: Augustus W. Peckham, 12960 Sophia Cir., Largo, Fla. 33540

[21] Appl. No.: 697,331

[22] Filed: Jun. 18, 1976

[51] Int. Cl.² .............................................. E03B 1/00
[52] U.S. Cl. .................................... 137/870; 361/357; 239/66; 307/115
[58] Field of Search ................ 307/141, 141.4, 141.8, 307/113, 114, 115, 112; 200/11 R, 14, 5 R, 35 R, 35 F; 361/331, 332, 346, 334, 357; 340/235; 137/624.2, 624.18, 870; 239/66, 67, 114, 115, 141, 141.4, 141.8; 47/60, 61, 62, 65, 48.5

[56] References Cited
U.S. PATENT DOCUMENTS

| 2,541,679 | 2/1951 | Van Auken | 337/72 |
| 2,625,591 | 1/1953 | George | 361/332 |
| 3,400,891 | 9/1968 | Mattwell | 239/66 |

Primary Examiner—Robert K. Schaefer
Assistant Examiner—Morris Ginsburg
Attorney, Agent, or Firm—Aaron Tushin

[57] ABSTRACT

An irrigation control system for selectively irrigating remote zones of an area to be irrigated, wherein each zone has an electromagnetically operated control valve, and a centrally located control box is provided having a zone selector switch, a power control switch for controlling the supply of power to the system, a power indicator light, a replaceable fuse, a valve reset button, and a simple and economical control circuit therefor.

4 Claims, 2 Drawing Figures

MANUALLY OPERATED LAWN SPRINKLING OR IRRIGATING SYSTEM

This invention is directed to an economical manually operated lawn sprinkling system utilizing a most inexpensive arrangement of electromechanical components wherein high cost automatic timing mechanisms are eliminated and relatively inexpensive underground wiring supplants much more expensive supply piping, said system being very simple, efficient, foolproof and cheap to operate as will become apparent from the following disclosure.

In the field of lawn sprinkling and land irrigation, many types of manual, automatic and semi-automatic systems are employed. For example, in many systems of irrigation, and in particular with lawn sprinkling of relatively large estates and golf courses, commercial grounds, etc., only a given amount of water supply and pressure may be available, hence, certain areas are laid out with separate systems which can adequately handle that particular area without overloading the system. Overloading, in such cases would result in lowering the ultimate pressure at the sprinkler heads to a point whereby the sprays would not overlap, leaving dry spots. In addition, if the supply is, as is the usual case, tied in with the water supply in the main structure or structures, weakened pressures from sprinkling result in trickles from faucets, showers, dishwashers and washing machines, etc. Systems with separate sprinkling mains or wells still have their limitations as to supplies and pressures, therefore, again, the necessity arises for controlled area sprinkling within the capacities of the various systems. This may be accomplished in several ways; each area may be interlaced with each other, with bypass control valves at the various field locations, necessitating physical operation of each manual valve at their respective locations, which at best is very cumbersome and time consuming; each area may be manifolded at a central location with manual gate valves at the manifold; or, electro-mechanical valves, such as low-voltage energized solenoid valves may be employed at the various field locations from a centrally located switching device, either automatically, semi-automatically, or manually operated.

By utilizing the present electro-mechanical system, less supply piping is required, and the laying of relatively inexpensive wiring is thereby substituted. However, automatic and semi-automatic control devices are inherently complicated and expensive, and are very often confusing to the very young, very old or less mechanically inclined who might be called upon to operate the device. Obviously, then, there is a need for an inexpensive, simple, safe and foolproof controlling device for remote area sprinkling systems.

My invention includes these desirable advantages and is novel is concept in that it employs very low-cost, readily available components in an attractive, yet inexpensive switch box. These components, which are held to a bare minimum, provide complete safety to the user, overload protection for the dependent controlled devices, while at the same time informing the user of the operating conditions of the entire system.

One of the primary objects of my invention is to provide the user with an inexpensive, conveniently located electrical control device which will energize remotely located electro-mechanical hydraulic valves for irrigation of numerous sets of area sprinkler systems. Another object is to provide the user with instantaneous knowledge as to which of the various systems is in operation. Still another object is to inform the user of any malfunction in any of the low voltage systems through an overload reset indicator, and finally, as an ultimate system protector, the device is equipped with a low amperage replaceable power fuse.

These, and other advantages, uses and innovations will become more apparent upon digesting the accompanying description and drawings, in which.

Figure 1:
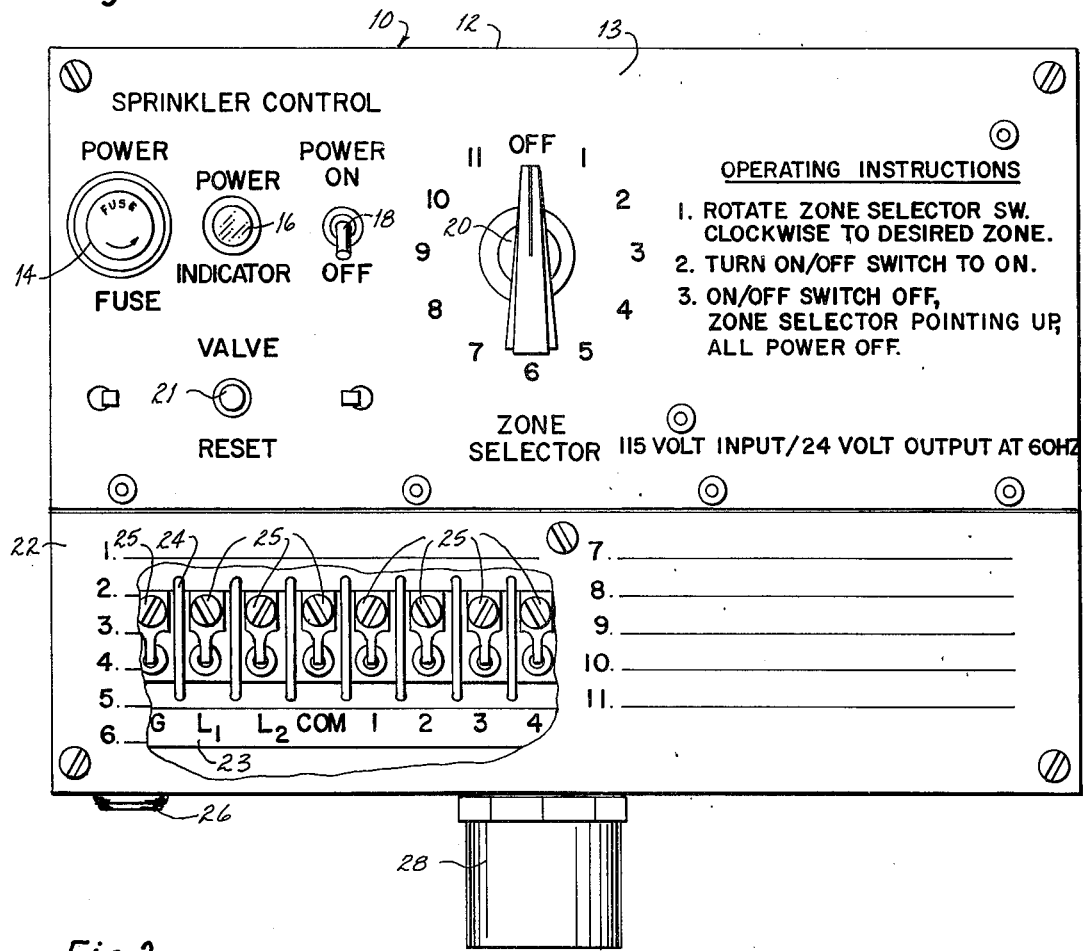
FIG. 1 is a front elevational view of one preferred embodiment of the invention.

Referring now to the drawings in detail, in which like numerals depict like parts of the invention, and to FIG. 1 in particular, the numeral 10 (with arrow) indicates the overall invention consisting of an enclosure 12, an input power fuse retainer 14, a power indicator pilat light 16, a dual purpose power master switch 18, a rotary zone selector switch 20, and an overload resetting device 21 or circuit breaker. A removable access plate 22 covers the terminal connection bar 24, which, in this configuration, contains sixteen screw type terminals 25, the purpose of which will be hereinafter described.

Below the bar 24 is a printed informational code 23 to aid the installer of the device. As is readily seen, the upper face portion 13 of the control box has explicit imprinted instructions for proper use of the device, plus descriptive information about the various visible components. The removable lower plate 22 has numerals corresponding to those about the face of the rotary switch 20 with a line at each numeral for descriptive annotation of the various areas controlled. At the bottom left of the device is an insulated bushing 26 to receive the input power supply consisting of three wires and a conventional grounded plug for insertion into a 115 volt outlet. At the center of the bottom of the device is a polyvinyl chloride pipe coupling 28 into which the required low-voltage wires are sent through to the various solenoid-operated valves, etc.

Figure 2:
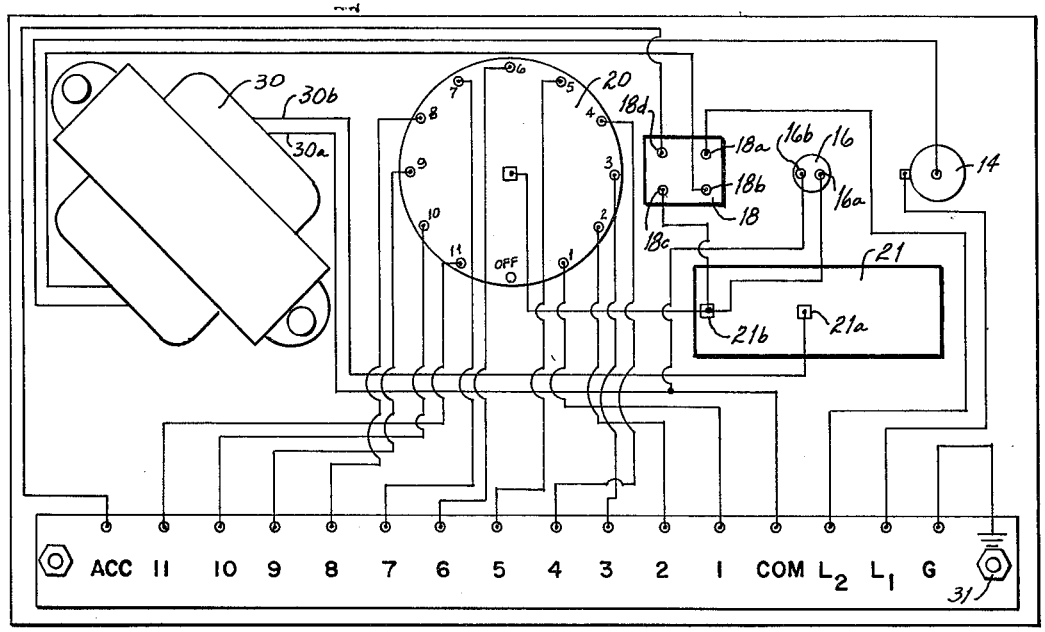
FIG. 2 is a rear view of the uncovered components with the wiring diagram shown.

Referring now to FIG. 2, the rear side of the components employed in the device are readily seen, along with the wiring diagram. Not visible in FIG. 1, but seen here in FIG. 2 is the transformer 30 which converts the 115 V.A.C. to 24 V.A.C.

For descriptive purposes in this specification, the terminals will be called out from right to left, since we are viewing the device from the rear. (Actually, of course, these terminals would read from left to right from the installer's viewpoint). The first terminal at the bottom of FIG. 2 from the right reads "G" for ground, and sequentially, they read $L_1$, $L_2$ for the input power leads. The next terminal is the low-voltage common lead, marked "COM", followed by area leads one through eleven, and finally, a spare terminal marked "ACC" for a possible accessory to be hereinafter explained. Following the diagram, the ground wire is attached to the chassis of the enclosure, such as to one of the bar mounting screws 31. $L_1$ passes through the fuse 14 to one input lead of the transformer 30; $L_2$ passes through one side 18a and 18b of the double pole, single throw switch 18 to the other input lead of the transformer. From the low-voltage output side of the transformer, one lead 30a becomes the common low-voltage lead and terminates at the common terminal screw marked "COM". The remaining low-voltage wire 30b goes to the input side 21a of the overload resetting device 21. From the breaker side 21b of the device 21, one wire goes to the center terminal of the rotary switch 20, another goes to the low-voltage side 18c of the double pole single throw switch 18, and still another wire goes from 21b to 16a of the indicator light 16. From 16b, a wire returns to "COM" to complete the indicator light circuit. From terminal 18d, a wire goes to the "ACC" terminal of the bar 24. Emanating from the eleven numbered positions (terminals) of the rotary selector switch 20 are eleven wires which end at their respectively numbered terminals on the bar 24. Thus it is obvious that when the plug is inserted into an outlet and master power switch 18 is turned on, input power is transmitted to the transformer through a fused link 14, and thence from the transformer through a low-voltage overload resetting device 21 to a rotary selector switch 20 and through an indicator light 16, and constantly through a low-voltage switch portion integral with the master power switch 18. Obviously then, when the main power switch is turned on, the selector switch may transmit power to whichever area has been preselected, as well as constantly supplying power to the accessory in all the selector positions. At this point, it is incumbent to explain the purpose of the position of the accessory switch 18, to wit: when a well system is used to irrigate a system, an electric pump is usually employed to produce water pressure. Most water pumps have a pressure tank with a device that senses a drop in pressure when a water system is turned on, which automatically starts the pump motor, which then remains running as long as is needed to furnish proper pressure. However, some systems do not have this sensing system and require external activation of the motor. This is usually accomplished through a relay type of switch, which is, in essence, another solenoid activated switch which will, in turn, initiate the required 220 volt power usually employed in pump motors. When a public water system is used, this pump is not usually required, although it is conceivable that a booster pump might be occasionally needed. Therefore, when an accessory pump is NOT needed, a simple, single pole, single throw switch can be used as a master switch in lieu of the double pole single throw switch. The primary purpose of the sequence of switching indicated by the instructions is to preclude unwanted activation of areas as the selector switch is rotated in either direction to the selected point. While not necessarily harmful to the system to reverse the sequence, from a practical standpoint, it is more desirable not to turn on other areas for an instant while proceeding to the selected area.

It is anticipated that wiring changes or substitution or addition of indicator lights to show malfunction in a given set of leads is entirely possible within this arrangement of components.

Another embodiment of this invention which is extremely similar utilizes the same components except for the terminal bar 24. This version is used for systems containing five or less areas to be irrigated and utilizes every other position on the selector switch and only provides five lines on the descriptive plate 22. The only purpose is to simplify the appearance of the device for esthetic reasons and to reduce possible confusion. It is, of course, understood, that configurations containing more or less area selections could be introduced without departing from the basic invention; also in the practice, numerous changes, modifications and the full use of equivalents may be resorted to without departing from the spirit or scope of the invention as outlined in the appended claims.

What I claim is:

1. In combination with a system for selectively irrigating remote zones each having electromagnetically operated valves for controlling the irrigation, a control box having mounted thereon a rotary zone selector switch having a center terminal and a series of spaced terminals, and a double pole single throw switch, said control box having mounted thereon a transformer having primary and secondary windings, and terminal connection means having first and second power input terminals, a common terminal, a series of terminals for connection to said electromagnetically operated valves, and an accessory terminal, an electrical connection from said first input terminal to said primary transformer winding, an electrical connection from said second input terminal through said double pole single throw switch to said transformer primary winding, an electrical connection from said transformer secondary winding to the center terminal of said zone selector switch, an electrical connection from said transformer secondary winding to the common terminal of the terminal connection means, electrical connections from each of said series of said spaced zone selector switch terminals to said series of terminals for said valves, respectively, and an electrical connection from one said secondary transformer connection through said double pole single throw switch to said accessory terminal.

2. The combination of claim 1, wherein an overload circuit breaker having a reset button is mounted on said control box and is electrically inserted in the connection between the transformer secondary winding and the center terminal of the selector switch.

3. The combination of claim 2, wherein a power indicator light is mounted on the control box and is electrically connected to the common terminal and to the center terminal of the selector switch.

4. The combination of claim 3, wherein a fuse retainer for a removable fuse is mounted on the control box and is electrically inserted in the connection from the first input terminal to the primary transformer winding.

* * * * *